INVENTOR.
Walter Silks

Dec. 2, 1969  W. SILKS  3,481,650
CORNER SPROCKET RETRACTION DEVICE
Filed Jan. 26, 1968  2 Sheets-Sheet 2
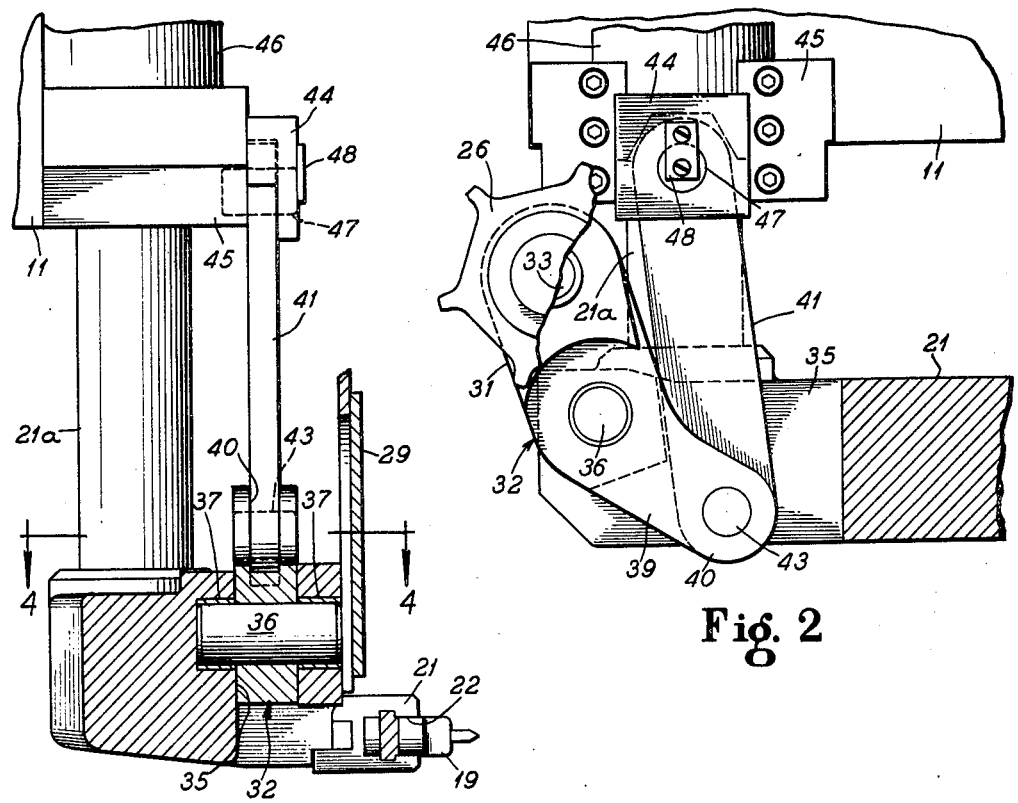
Fig. 2
Fig. 3
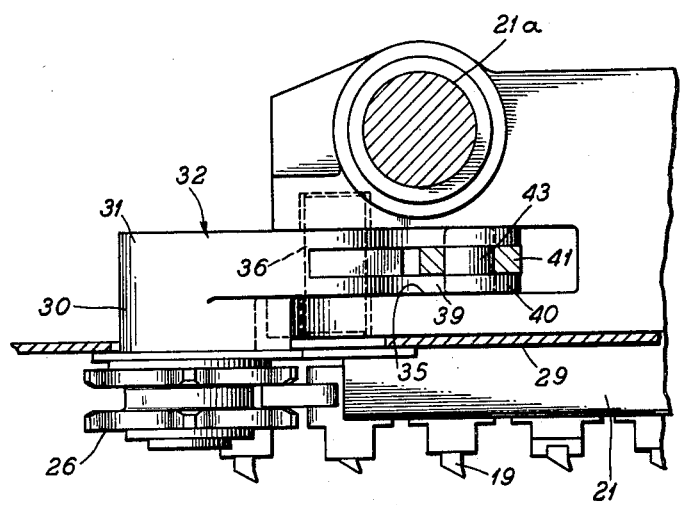
Fig. 4
INVENTOR.
Walter Silks
BY
ATTORNEYS United States Patent Office 3,481,650
Patented Dec. 2, 1969

3,481,650
CORNER SPROCKET RETRACTION DEVICE
Walter Silks, Downers Grove, Ill., assignor to Westinghouse Air Brake Company, Pittsburgh, Pa., a corporation of Pennsylvania
Filed Jan. 26, 1968, Ser. No. 700,919
Int. Cl. E21c 1/00
U.S. Cl. 299—59                                        6 Claims

ABSTRACT OF THE DISCLOSURE

Retraction means for a corner sprocket for the lower trimmer bar of a boring type continuous mining machine, retracting the corner sprocket as the trimmer bar is moved above the ground, as when it is desired to raise the trimmer bar and withdraw the machine from a working face and to tram the machine from place to place. The trimmer bar is elevated and lowered by the usual hydraulic jacks connected between the main supporting housing for the boring heads, and the trimmer bar and has an open portion at one end having a bell crank lever pivoted in this open portion intermediate the ends of the bell crank lever. The bell crank lever forms a bearing support for the corner sprocket, which is journalled on its outer end. A link pivoted to the main supporting housing for the boring heads is connected to the inner lever arm of the bell crank and moves downwardly into the open portion of the trimmer bar upon upward movement of the trimmer bar, to retract the bell crank and corner sprocket. The open portion of the trimmer bar is behind a pusher plate. The link and bell crank movable into the open portion in cooperation with the pusher plate keeps the coal dust from building up around the bell crank and thereby avoids obstruction to movement of the bell crank. The link also serves to hold the corner sprocket in its operating and retracted positions.

BACKGROUND OF THE INVENTION

The present invention embodies the automatic retraction principles of Patent No. 2,885,196, which issued to Jerry Karlovsky on May 5, 1959, but differs from that of the Karlovsky patent in that a link member connected between the bell crank and mining machine frame in addition to providing a retraction connection for the corner sprocket also serves as a lock out member for the corner sprocket, holding the corner sprocket in its extended and retracted positions.

It has also been the practice to use separate hydraulic jacks to retract the corner sprocket. Since space limitations are small, small jacks must be used. These jacks have insufficient strength to lock the sprocket in its extended position. Such hydraulic jack extension and retracting means are shown in my prior Patent No. 2,890,033, dated June 9, 1959, and in Patent No. 2,991,059, which issued to Jerry Karlovsky on July 4, 1961.

SUMMARY OF THE INVENTION AND OBJECTS

In the retraction device of the present invention the direction changing corner sprocket is supported on one lever arm of a bell crank lever, which in turn is mounted between the furcations of a bifurcated open end portion of the trimmer bar. A link, connected between the other lever arm of the bell crank and the main supporting housing for the boring heads, provides the retraction couple to retract the corner sprocket about the axis of the bell crank when the trimmer bar is elevated above the ground. The link moves into the space between the furcations of the bell crank when retractably moving the trimmer bar, and serves to lock the corner sprocket both in its operating and retracted positions. The open or bifurcated portion of the trimmer bar is behind the pusher plate of the machine, which insures full movement of the corner sprocket, unobstructed by coal dust, into its extended and retracted positions. The open portion besides being protected by the pusher plate is cleaned by movement of the link and bell crank into this open portion.

A principal object of the present inventon, therefore, is to provide a simplified form of retraction means for the corner sprocket for the lower trimmer bar of a continuous mining machine, which serves to hold the corner sprocket in both its extended and retracted positions.

Another object of the invention is to provide a self-locking retraction means for the corner sprocket at one end of the trimmer bar of a continuous mining machine, automatically retracting the corner sprocket upon raising of the trimmer bar above the ground, to facilitate tramming movement of the machine along a mine, and arranged with a view toward preventing coal dust from hindering extension and retraction of the corner sprocket.

A further object of the invention is to provide a simple and improved form of corner sprocket retraction device in which a link connected between the main supporting housing for the boring heads, and a lever forming a bearing support for the corner sprocket, serves to extend and retract the corner sprocket and to positively hold the corner sprocket in its extended and retracted positions.

These and other objects of the invention will appear from time to time as the following specification proceeds and with reference to the accompanying drawings.

DESCRIPTION OF THE DRAWINGS

FIGURE 2 is an enlarged fragmentary detail view of the retractable support for the corner sprocket, with certain parts broken away and shown in transverse section, and showing the corner sprocket in its retracted position;

FIGURE 3 is a partial fragmentary enlarged sectional view taken substantially along line 3—3 of FIGURE 1 and showing the pusher plate broken away, with the trimmer bar in vertical longitudinal section; and FIGURE 4 is a partial fragmentary plan view, with certain parts shown in horizontal section, and looking substantially along line 4—4 of FIGURE 3.

DESCRIPTION OF PREFERRED EMBODIMENT OF INVENTION

Figure 1:
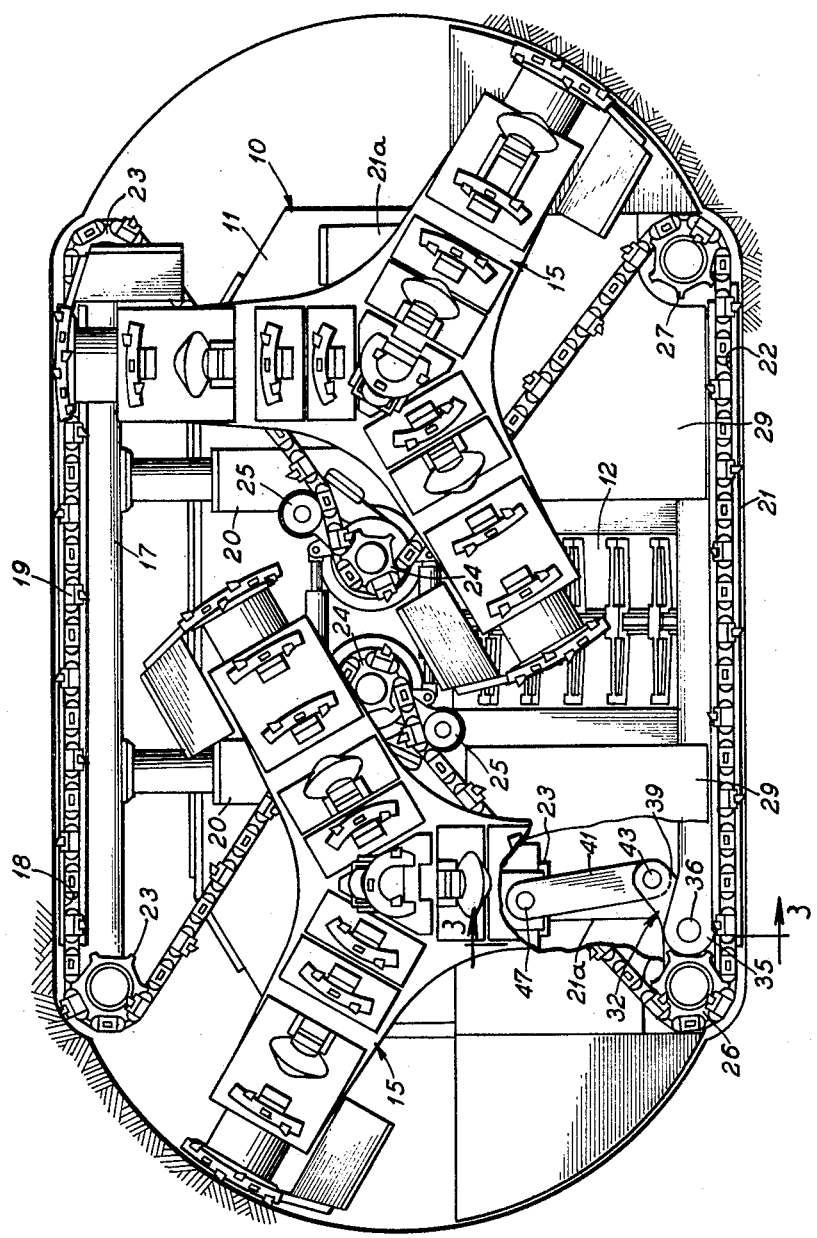
FIGURE 1 is a view in front elevation of a continuous mining machine having a portion of a boring head and pusher plate behind the boring head broken away in order to illustrate the corner sprocket retraction device of the present invention.

Referring now to the details of the embodiment of the invention illustrated in the drawings, 10 generally designates a continuous mining machine of the boring type having a transversely extending main supporting housing 11 supported in advance of the main frame of the machine (not shown) for vertical adjustment with respect to the ground, on the usual hydraulic jacks (not shown). The main supporting housing 11 has an elevating conveyor 12 extending therealong and beyond the rear end of the main frame, for picking up the mined material from the ground and transporting it beyond the rear end of the machine, for loading into suitable material carrying means such as shuttle cars, a conveyor and the like.

The main supporting housing 11 also forms a bearing support for a pair of laterally spaced rotatably driven boring heads 15, 15 arranged to cut in intersecting cutting paths out of phase relation with respect to each other and rotatably driven to move toward each other along the ground, to progress the cuttings to the center of the machine to be picked up the conveyor 12. The boring heads 15, 15 are conventional forms of boring heads and are no part of the present invention except insofar as they are parts of the over-all machine, so need not herein be shown or described further.

An upper trimmer bar 17 extends between the boring heads 15 and has a chain guide 18 extending therealong for guiding a cutter bit carrying cutter chain 19, to mine along the roof and cut out the cusps left between the boring heads of the machine. The trimmer bar 17 is mounted on the main supporting housing 11 for vertical adjustable movement with respect thereto by means of conventional hydraulic jacks 20, 20 mounted on the front face of the main supporting housing 11 and extending upwardly therefrom.

A lower trimmer bar 21 is suspended from the main supporting housing 11 on hydraulic jacks 21a, 21a and has a guide 22 for the cutter chain 19 extending therealong, to guide the cutter chain to cut along the mine floor adjacent and beyond the cutting paths of the boring heads 15, to mine the cusps upstanding from the floor between the boring heads 15, and to provide a straight floor to provide the room to accommodate tramming of the machine into and out of a working place.

The cutter chain 19 is trained about corner sprockets 23, 23 at opposite ends of the upper trimmer bar 17 and downwardly and inwardly therefrom along and under drive sprockets 24, 24, journalled on the front wall of the main supporting housing 11, and driven from drive gearing within said main supporting housing in a conventional manner. Tension idlers 25, 25 are provided to maintain the cutter chain under the proper tension. The incoming run of the cutter chain 19 is trained from a drive sprocket 24 and tension idler 25 about a retractable corner sprocket 26 movably mounted on the trimmer bar 21 at one end thereof in a manner which will hereinafter be more clearly described as the following specification proceeds. The outgoing run of the trimmer chain 19 is trained around a corner sprocket 27 at the opposite end of the guide 22 from the corner sprocket 26, to and around an associated drive sprocket 24.

Pusher plates 29, 29 are suitably mounted on the front face of the trimmer bar 21 and extend vertically therefrom for vertical adjustable movement therewith, to prevent the mined coal from collecting behind the trimmer bar, and to cooperate with the two boring heads 15, 15 to maintain the material in front of said boring heads to be pushed thereby toward the center of the machine, to be picked up by the conveyor 12.

Referring now in particular to the retractable bearing support for the corner sprocket 26, said corner sprocket is shown in FIGURE 4 as being spaced in front of the pusher plate 29 and as being mounton a right angled forward extension 30 of a lever arm 31 of a bell crank 32. A shaft 33 extending forwardly on said right angled forward extension forms a bearing support for the corner sprocket 26. The bell crank 32 extends within an open or bifurcated portion 35 of the trimmer bar 21, and is mounted between the furcations of said bifurcated portion, on a pivot pin 36. The pivot pin 36 is journalled in the furcations of the bifurcated portion 35 on bearings 37, herein shown as being sleeve bearings. The bell crank 32 has a second lever arm 39 extending along the open portion 35. The inner end of the lever arm 39 has a bifurcated portion 40, receiving the lower end of a link 41 between the furcations thereof. A pivot pin 43 is provided to pivotally connect said link to said lever arm.

The link 41 extends upwardly of the pivot pin 43 along the inside of a right angled bracket 44, extending outwardly of a support 45 for a cylinder 46 of a hydraulic jack 21a. A pivot pin 47 extending through the bracket 44 and support 45 is provided to pivotally connect the upper end of the link 41 to said bracket and support. A locking plate 48 suitably secured to the outside of the bracket 44 and pivot pin 47, is provided to lock the pin 47 in position.

It is evident that since the link 41 is connected between the main supporting housing 11 and the lever arm 39 of the bell crank 32, as the trimmer bar 21 is moved vertically toward the main supporting housing 11, the link 41 and lever arm 39 of the bell crank 32 will move downwardly within the open portion of the trimmer bar 21, and pivot the bell crank to elevate the corner sprocket 26 above the trimmer bar and rectractably move said corner sprocket inwardly towards the center of the machine into a retracted position. As, however, the trimmer bar 21 is lowered into a cutting position, the link 41 will extend the corner sprocket 26 into an extended position and hold said corner sprocket in its extended cutting position without any additional locking means or manual effort, other than the operation of the control valve to raise or lower the lower trimmer bar 21.

While the link 41 is shown as being a solid link, it should be understood that this link may also be adjustable, particularly where the cutting range of the lower trimmer bar is varied.

It should also be understood that since the pusher plate 29 is forwardly of the open portion of the trimmer bar, that said pusher plate reduces the collection of coal dust into said open portion, and the link 41 and lever arm 39 of the bell crank 32 moving along said open portion in cooperation with said pusher plate also serves to keep said open portion clear from any coal dust on the floor that may tend to collect therein.

While I have herein shown and described one form in which the invention may be embodied, it should be understood that various variations and modifications in the invention may be attained without departing from the spirit and scope of the novel concepts thereof.

I claim as my invention:

1. In a continuous mining machine of the boring type:
   a main frame;
   a main supporting housing supported in advance of said main frame;
   a plurality of boring heads rotatably mounted on said main supporting housing to cut contiguous bores in advance of said main supporting housing;
   a horizontally disposed trimmer bar mounted on said main supporting housing;
   a cutter chain guided along said trimmer bar to cut the cusp left between the boring heads;
   jack means suspending said trimmer bar from said main supporting housing and adjustably moving said trimmer bar vertically;
   a direction changing member at one end of said trimmer bar for changing the direction of said cutter chain and being mounted on movable mounting means for movement between extended and retracted positions relative to said trimmer bar;
   coupling means for moving said direction changing member responsive to movement of said trimmer bar relative to said main supporting housing;
   said coupling means including a lever pivoted intermediate the ends thereof to said trimmer bar and having said ends connected respectively to said main supporting housing and said movable mounting means for moving said direction changing member to retracted position upon movement of said trimmer bar toward said main supporting housing and for moving said direction changing member to extended position upon movement of said trimmer bar away from said main supporting housing.

2. The structure of claim 1 in which the coupling means includes a link pivotally connected to said main supporting housing and said lever.

3. The structure of claim 1 wherein:
   an open area is provided in said trimmer bar, opening to the top and bottom and end of said trimmer bar;
   said lever is pivotally mounted in said open area; and
   said coupling means is movable within said open area to extend and retract said direction changing member and to hold said direction changing member in its extended and retracted positions.

4. The structure of claim 3 wherein:

a pusher plate extends along said trimmer bar to push the cuttings into the path of an associated boring head upon advance of the machine during a mining operation; and the open area is behind said pusher plate.

5. The structure of claim 1, wherein:

said trimmer bar has an open area open to the top and bottom and one end of said trimmer bar;

the direction changing member is a corner sprocket, rotatably supported on said movable mounting means;

said lever extends within said open area;

said coupling means includes a link pivotally connected between said main supporting housing and said lever, said link also extending within said open area; and said coupling means is effective to hold said corner sprocket in its said extended and retracted positions.

6. The structure of claim 5, wherein:

a pusher plate extends vertically of said trimmer bar to push the cuttings into the path of an associated boring head upon advance of the machine during a mining operation; and the open area, lever and link are behind said pusher plate.

References Cited

UNITED STATES PATENTS

| | | | |
|---|---|---|---|
| 2,705,625 | 4/1955 | Robbins | 299—59 |
| 2,711,890 | 6/1955 | Robbins et al. | 299—59 |
| 2,719,709 | 10/1955 | Salmons | 299—59 X |

ERNEST R. PURSER, Primary Examiner

UNITED STATES PATENT OFFICE
CERTIFICATE OF CORRECTION

Patent No. 3,481,650    Dated December 2, 1969

Inventor(s) Walter Silks

It is certified that error appears in the above-identified patent and that said Letters Patent are hereby corrected as shown below:

Column 2, line 70, after "up" insert --by--.

Column 3, line 50, change "mount" to --mounted--;
  line 53, change "on" to --of--.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents